United States Patent
Lee et al.

(10) Patent No.: US 10,404,318 B2
(45) Date of Patent: Sep. 3, 2019

(54) METHOD FOR RECOVERING ORIGINAL SIGNAL IN REDUCED COMPLEXITY DS-CDMA SYSTEM

(71) Applicant: UNIVERSITY-INDUSTRY COOPERATION GROUP OF KYUNG HEE UNIVERSITY, Yongin-si (KR)

(72) Inventors: Sung Young Lee, Seongnam-si (KR); Dinh Mao Bui, Yongin-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 16/066,087

(22) PCT Filed: May 31, 2016

(86) PCT No.: PCT/KR2016/005771
§ 371 (c)(1),
(2) Date: Jun. 26, 2018

(87) PCT Pub. No.: WO2017/188501
PCT Pub. Date: Feb. 11, 2017

(65) Prior Publication Data
US 2019/0058501 A1    Feb. 21, 2019

(30) Foreign Application Priority Data

Apr. 29, 2016 (KR) ......................... 10-2016-0053521
May 26, 2016 (KR) ......................... 10-2016-0065123

(51) Int. Cl.
*H04L 1/20*     (2006.01)
*H04L 27/20*    (2006.01)
(Continued)

(52) U.S. Cl.
CPC ......... *H04B 1/7087* (2013.01); *H04B 1/7103* (2013.01); *H04L 1/20* (2013.01);
(Continued)

(58) Field of Classification Search
CPC combination set(s) only.
See application file for complete search history.

(56) References Cited

U.S. PATENT DOCUMENTS 6,363,049 B1 *   3/2002  Chung ................ H04B 1/7075
                                                370/210
6,671,338 B1 *  12/2003  Gamal ................ H04L 1/0048
                                                375/144

(Continued)

FOREIGN PATENT DOCUMENTS

JP    2005-235899     9/2005
KR    10-2000-0041526 7/2000
(Continued)

OTHER PUBLICATIONS

F. Perez-Cruz et al., "Gaussian Processes for Nonlinear Signal Processing", IEEE Signal Processing Magazine, vol. 30, No. 4, pp. 40-50, Jul. 2013.
(Continued)

*Primary Examiner* — Linda Wong
(74) *Attorney, Agent, or Firm* — Lex IP Meister, PLLC

(57) ABSTRACT

Disclosed is a method for recovering an original signal in a DS-CDMA system based on complexity reduction. In such a method, first, a partial derivative for rMLL is calculated by using a partial derivative generated by applying fast Fourier transform (FFT) to a reduced negative marginal log likelihood (rMLL) obtained by applying a law of log determinant to a Gaussian process regression (GPR) scheme used for the multi-user detection and thereafter, integrating stochastic gradient descent (SGD). Thereafter, the rMLL is calculated (Continued)

by using the partial derivative for the rMLL and a hyper-parameter is updated to a convergence point until an error gap is converged by repeated calculation of the rMLL. Next, a kernel function used for estimating a matched filter is calculated by using the hyper-parameter estimated through the convergence and the original signal for each of multi-users is recovered by using the kernel function.

6 Claims, 2 Drawing Sheets

(51) Int. Cl.
*H04B 1/7087* (2011.01)
*H04L 27/26* (2006.01)
*H04B 1/7103* (2011.01)
*H04B 1/707* (2011.01)

(52) U.S. Cl.
CPC .............. *H04L 1/203* (2013.01); *H04L 27/20* (2013.01); *H04L 27/2017* (2013.01); *H04L 27/2628* (2013.01); *H04B 2001/70706* (2013.01)

(56) References Cited

U.S. PATENT DOCUMENTS

| | | | | |
|---|---|---|---|---|
| 6,930,777 | B1* | 8/2005 | Sevick-Muraca | G01N 15/0205 356/336 |
| 6,963,604 | B2* | 11/2005 | Erdogmus | H04L 25/0305 375/229 |
| 7,136,410 | B2* | 11/2006 | Choi | H04B 1/71055 375/148 |
| 7,161,973 | B2* | 1/2007 | Ghosh | H04B 1/71055 375/141 |
| 7,864,663 | B2* | 1/2011 | Dent | H04B 1/7097 370/210 |
| 8,595,155 | B2* | 11/2013 | Ide | G06F 17/18 706/12 |
| 8,768,659 | B2* | 7/2014 | Vasudevan | G06F 17/18 703/2 |
| 8,880,439 | B2* | 11/2014 | Archambeau | G06N 20/00 706/12 |
| 9,769,547 | B2* | 9/2017 | Niedzwiecki | H04Q 9/00 |
| 2004/0100928 | A1* | 5/2004 | Ben-David | H04B 1/7105 370/335 |
| 2005/0225570 | A1* | 10/2005 | Collins | G09G 3/2022 345/660 |
| 2009/0244365 | A1* | 10/2009 | Takeda | G06K 9/6247 348/441 |
| 2009/0249134 | A1* | 10/2009 | RostamPisheh | H03M 13/2764 714/702 |
| 2011/0257949 | A1* | 10/2011 | Vasudevan | G06F 17/18 703/2 |
| 2012/0084042 | A1 | 4/2012 | Yuan | |
| 2012/0195399 | A1* | 8/2012 | Zhu | H04L 1/0046 375/341 |
| 2012/0253794 | A1* | 10/2012 | Chun | G10L 21/007 704/201 |
| 2015/0112900 | A1* | 4/2015 | Ariyoshi | G06N 20/00 706/12 |
| 2016/0028450 | A1* | 1/2016 | Trachewsky | H04B 7/022 370/315 |
| 2018/0049192 | A1* | 2/2018 | Beale | H04W 72/0446 |
| 2018/0294997 | A1* | 10/2018 | Lee | H04B 7/0452 |

FOREIGN PATENT DOCUMENTS

| | | |
|---|---|---|
| KR | 10-2006-0079662 | 7/2006 |
| KR | 10-2012-0040637 | 4/2012 |

OTHER PUBLICATIONS

R. Boloix-Tortosa et al., "Proper Complex Gaussian Processes for Regression", arXiv: 1502.04868 v2, Feb. 18, 2015.
R. Boloix-Tortosa et al., "Gaussian Processes Regressors for Complex Proper Signals in Digital Communications", 2014 IEEE 8th Sensor Array and Multichannel Signal Processing Workshop (SAM), Jun. 22-25, 2014, p. 137-140.
Murillo-Fuentes, Juan Jose et al., "Gaussian Process Regressors for Multiuser Detection in DS-CDMA systems", IEEE Transactions on Communications, vol. 57, issue 8, pp. 2339-2347, Aug. 2009.
Erik Rodner et al., "Large-Scale Gaussian Process Classification with Flexible Adaptive Histogram Kernels", Proceedings of European Conference on Computer Vision (ECCV), vol. 4, pp. 85-98, 2012.
T. Tony Cai et al., "Law of log determinant of sample covariance matrix and optimal estimation of differential entropy for high-dimensional Gaussian distributions", Journal of Multicariate Analysis, vol. 137, pp. 161-172, 2015.
Dinh-Mao Bui et al., "Fast Gaussian Process Regression for Multiuser Detection in DS-CDMA", IEEE Communications Letters, vol. 21, No. 2, pp. 406-409, 2017, Abstract only.

* cited by examiner

METHOD FOR RECOVERING ORIGINAL SIGNAL IN REDUCED COMPLEXITY DS-CDMA SYSTEM

TECHNICAL FIELD

The present invention relates to the field of communication, machine learning, and optimization, and more particularly, to a method for recovering an original signal in a direct sequence-code division multiple access (DS-CDMA) system based on complexity reduction using Gaussian process regression.

BACKGROUND ART

A direct sequence-code division multiple access (DS-CDMA) system distinguishes a user by a signal of a frequency band. Unfortunately, inter-signal interference occurs even among a small number of users and is recognized as multiple access inference (MAI). This noise problem causes a critical increase in bit error rate (BER) under a near/far effect, which is a sensitive issue in the DS-CDMA system.

To mitigate such a problem, a multiuser detection (MUD) technique has been applied to eliminate the interference. In such a technique, a known optimization solving means for the MUD may be acquired through minimizing the means square error (MMSE). Nonetheless, a lot of computational resources and training effort are required for performing the calculation. Obviously, such a method is not suitable for implementation in most communication devices. In order to solve such a problem, many approaches including multilayer perceptron, a support vector machine, a wavelet neuron network, and Gaussian process regression (GPR) are proposed. Of the machine learning approaches, the GPR is considered the most promising tool in terms of flexibility and accuracy.

In fact, a Gaussian process is widely used for prediction and classification in many research areas such as data communications, networking, and signal processing. Rather than determining parameters of a model from a scratch, the Gaussian process can help to adopt the parameters to represent an actual underlying function. As such, the Gaussian process is a suitable choice for noise, corrupted or erroneous data. However, such a method has a disadvantage of high complexity. In a standard implementation, the GPR requires complexity of $O(n^3)$ for computation and $O(n^2)$ for storage when computing n training points in a dataset. Even in the application of a sparse spectrum Gaussian process, if m is the number of basic functions, the complexity is still $O(mn^2)$ for computation and $O(nm)$ for storage.

Accordingly, there is a need for another scheme capable of reducing the complexity of the GPR.

DISCLOSURE

Technical Problem

The present invention has been made in an effort to provide a method for recovering an original signal in a DS-CDMA system which can reduce complexity of GPR.

Technical Solution

An exemplary embodiment of the present invention provides a method for recovering an original signal through multi-user detection in a synchronous mobile communication system, including: calculating a partial derivative for rMLL by using a partial derivative generated by applying fast Fourier transform (FFT) to a reduced negative marginal log likelihood (rMLL) obtained by applying a law of log determinant to a Gaussian process regression (GPR) scheme used for the multi-user detection and thereafter, integrating stochastic gradient descent (SGD); calculating the rMLL by using the partial derivative for the rMLL; updating a hyper-parameter to a convergence point until an error gap is to converged by repeated calculation of the rMLL; calculating a kernel function used for estimating a matched filter by using the hyper-parameter estimated through the convergence; and recovering the original signal for each of multi-users by using the kernel function. Where the partial derivative may follow an equation below.

$$\frac{\partial}{\partial \theta_1} \mathcal{F}_{rMLL} = -\frac{\sqrt{\frac{2}{\pi}} \tilde{x}_k^2(i) \exp(2\pi^2 \theta_2^2 \omega^2)}{\theta_2 \theta_1^3}$$

Where $$\mathcal{F}_{rMLL}(\theta) = \frac{1}{2n} \sum_k \frac{\tilde{x}_k^2(i)}{\mathcal{F}_{SE}(\omega_k)}$$

and represents Fourier transform for the rMLL, $\theta_1$ represents an output-scale size, $\theta_2$ represents a time-scale of y from one moment up to a next moment, $\omega$ is a frequency representation of a received signal y in a frequency domain, a tilde symbol represents Fourier transform of an original signal x(i) in $\tilde{x}(i)$, and $\mathcal{F}_{SE}(\omega) = \theta_2 \theta_1^2 \sqrt{2\pi} \exp(-2\pi^2 \omega^2 \theta_2^2)$ and represents Fourier transform for the kernel function. Further, the error gap (RMSE) by repeated computation of the rMLL may be evaluated through a relationship equation below.

$$RMSE = \sqrt{\frac{\sum_{j=1}^{n} \mathcal{F}_j^{(k)} - \mathcal{F}_j^{(k-1)}}{n}}$$

Where $\mathcal{F}_j^{(k)}$ and $\mathcal{F}_j^{(k-1)}$ represent a value of the rMLL at a target location j after $k^{th}$ and $(k-1)^{th}$ repetitions, respectively, and n represents the number of repetitions. In addition, the update may be performed by using the relationship equation below.

$$\theta_2^{(k)} \leftarrow \theta_2^{(k-1)} + \alpha(k) \frac{\partial}{\partial \theta_2^{(k-1)}} \mathcal{F}_{rMLL}$$

$$\theta_1^{(k)} \leftarrow \theta_1^{(k-1)} + \alpha(k) \frac{\partial}{\partial \theta_1^{(k-1)}} \mathcal{F}_{rMLL}$$

Where $\alpha(k)=1/(k+1)$ represents a Robbins-Monroe decay function for $k^{th}$ repetitions. The kernel function follows the relationship equation below.

$$k(y_i, y_j) = \theta_1^2 \exp\left(-\frac{\|y_i - y_j\|^2}{2\theta_2^2}\right)$$

Further, applying the law of log determinant to the Gaussian process regression (GPR) scheme may be convergence to a constant using a law of log determinant log |P| while minimizing the following relationship equation which is a negative log likelihood for estimating a hyper-parameter set constituted by $$\theta_1 \text{ and } \theta_2 - \log p(x(i)|y,\theta) = \frac{1}{2}x^T(i)P^{-1}x(i) + \frac{1}{2}\log|P| + \frac{n}{2}\log(2\pi)$$

Where $p(x(i)|y,w) = \mathcal{GP}(x(i)|\Phi^T w, \sigma_{noise}^2 I)$ and represents a joint Gaussian distribution, the matched filter w is a random variable and follows the Gaussian distribution like $p(w) = \mathcal{N}(w|0, \sigma_w^2 I)$ which is a probability of w, $\sigma_{noise}$ and $\sigma_w$ represent standard deviations of noise and the matched filter, respectively, $I_n$ represents a unit matrix having a size of n, $\Phi = [\phi(y_1), \phi(y_2)], \ldots, \phi(y_n)]$ represents a vector of non-linear mapping to a higher dimensional space for a received signal x(i), and P represents a covariance matrix.

Advantageous Effects

According to the present invention, the complexity of the GPR can be reduced to become O(n log n) for computation and O(n) for storage when n is the number of training points. Consequently, through the improvement, by comparing the Gaussian process in the related art and MMSE estimation, regression can be greatly accelerated so as to maintain preferable BER.

MODE FOR INVENTION

Figure 1:
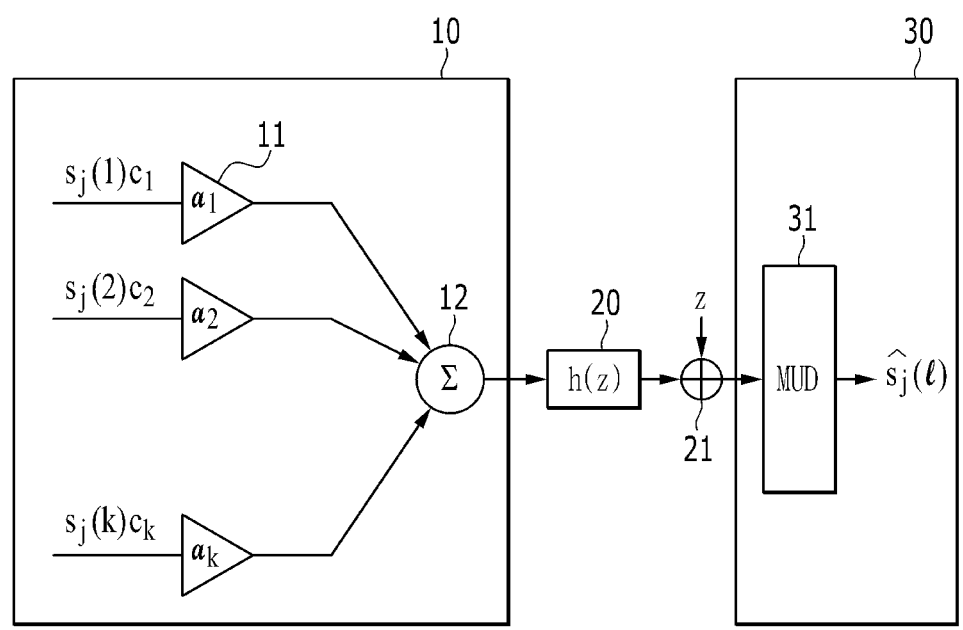
FIG. 1 is a diagram illustrating a synchronous DS-CDMA system model to which the present invention is applied.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

First, an exemplary embodiment of the present invention may be applied to a synchronous DS-CDMA system illustrated in FIG. 1. In such a system, all users transmit symbols at the same symbol rate. In such a system, symbol k is transmitted at moment j. Each user's symbol $s_j(l)$ is multiplied by a spreading code $c_l$. In this case, the spreading code $c_l$ is a sequence of $n_S$ pseudorandom binary values considered as a chip. Resulting signals are amplified by different gains $a_l$ through a multiplier 11 of a transmitter 10 and then summed and transmitted in various forms via a summer 12.

The transmitted signal is received via a channel response h(z) 20 in a chip period. In this case, additive white Gaussian noise (AWGN) is added during transmission and is indicated through a summer 12 in a system model in FIG. 1.

Meanwhile, a multi-user detector (MUD) 31 of a receiver 30 restores a transmission bit for a specific user by using the received signal, that is, a chip signal output through the summer 12, and outputs the restored transmission bit as $\hat{s}_j(l)$.

A. Assumption

An input data set having n training points is referred to as $D = \{x_t, y_t\}_{t=1, \ldots, n}$. Herein, $\{x_t \in \mathbb{R}^d\}$ represents a vector of an original signal and $y_t$ represents a column vector of the received signal at a time step t. A relationship of the vectors is shown in [Equation 1].

$$y_t = SAx_t + n_t \quad \text{[Equation 1]}$$

Where S represents a U×V matrix (each column of such a matrix containing a spreading code for each user). A represents a V×V diagonal matrix and contains a size for a user. The size represents a fading degree of the signal transmitted over a channel (the fading degree indicates how far the user is from the receiver). Last, $n_t$ represents the additive white Gaussian noise (AWGN) added to the channel with time progress.

In the receiver, an original signal $x_t(i)$ of an i-th $i^{th}$ user needs to be restored as shown in [Equation 2].

$$\hat{x}_t(i) = \text{sgn}(w_i^T y_t) \quad \text{[Equation 2]}$$

Where $w_i$ represents is a matched filter for the $i^{th}$ user. Event though $w_i$ is an optimal non-linear vector, such a vector may be estimated as shown in [Equation 3] by using an MMSE method.

$$w_i^* = \underset{w_i}{\text{argmin}}\, \mathbb{E}\left[(x_t(i) - w_i^T y_t)^2\right] = C_{yy}^{-1} C_{yx} \quad \text{[Equation 3]}$$

Where $C_{yy} = \mathbb{E}[y_t y_t^T]$ represents an autocorrelation of the received vector and $C_{yx} = \mathbb{E}[y_t x_t(i)]$ represents a cross-correlation between the received vector and the original. [Equation 3] is known as distributed MMSE and may be solved without finding spreading sequences of other users. However, the problem of the solving means is that a huge training data set for an inverse matrix is required and high computational complexity is also required.

B. Deriving MUD of Gaussian Process $\Phi = [\phi(y_1), \phi(y_2)], \ldots, \phi(y_n)]$ represents the vector of non-linear mapping to a higher dimensional space of the received signal and $\phi(\bullet)$ represents a corresponding mapping function. When an original signal vector $x(i) = [x_1(i), x_2(i), \ldots, x_n(i)]^T$ is applied to the received signal vector $y = [y_1, y_2, \ldots, y_n]$, the original signal vector to the received signal vector has a joint Gaussian distribution as shown in [Equation 4].

$$p(x(i)|y,w) = \mathcal{GP}(x(i)|\Phi^T w, \sigma_{noise}^2 I) \quad \text{[Equation 4]}$$

Where the matched filter w is actually a random variable. A probability of w follows a Gaussian distribution like $p(w) = \mathcal{N}(w|0, \sigma_w^2 I)$ and $\sigma_{noise}$ and $\sigma_w$ represent standard deviations of noise and the matched filter, respectively and $I_n$ represents a unit matrix having a size of n. By applying a Bayes' law to [Equation 4], a posterior distribution of w is computed as shown in [Equation 5].

$$p(w|x(i), y) = \frac{p(w)p(x(i)|w, y)}{p(x(i)|y)} \quad \text{[Equation 5]}$$

Theoretically, [Equation 3] may be transformed into a nonlinear form using maximum a posterior (MAP) estimation of the random variable w for [Equation 5]. The transformation is expressed as shown in [Equation 6].

$$w^* = \underset{w}{\operatorname{argmin}}\{\|x(i) - \Phi^T w\|^2 + \lambda\|w\|^2\} \quad \text{[Equation 6]}$$

Where $\lambda = (\sigma_{noise}/\sigma_w)^2$. A equation term $\lambda\|w\|^2$ is integrated into a MAP as a regularizer to skip an over-fitting problem. By discovering $w^*$, the estimation of an original signal $\hat{x}(i)$ may be obtained as shown in [Equation 7].

$$\hat{x}(i) = k^T P^{-1} x(i) \quad \text{[Equation 7]}$$

Where in the case of $k(y_i, y_j) = (\phi(y_i)^T \phi(y_j))$, $k = [k(y, y_1), k(y, y_2), \ldots, k(y, y_n)]$ represents a kernel function of the non-linear transformation and $P = K + \sigma_{noise}^2 I$ (where K represents a covariance matrix which is $K_{ij} = k(y_i, y_j)$). Due to a priority of a processing speed, a square exponential kernel function is adopted to compute the estimate of the original signal. Such a kernel function is shown in [Equation 8].

$$k(y_i, y_j) = \theta_1^2 \exp\left(-\frac{\|y_i - y_j\|^2}{2\theta_2^2}\right) \quad \text{[Equation 8]}$$

Where $\theta_1$ represents an output-scale size and $\theta_2$ represents a time-scale of y from one moment to a next moment. A set $\theta = \{\theta_1, \theta_2\}$ is known as a set of hyper-parameters. Next, the estimation of $\theta$ may be computed as shown in [Equation 9].

$$\theta^* = \underset{\theta}{\operatorname{argmin}} p(x(i)|y, \theta) \quad \text{[Equation 9]}$$

In order to solve [Equation 9], $O(n^3)$ for the computational complexity and $O(n^2)$ for storage when the size of the storage is n are assumed. Most of the complexity is caused by computing the inverse matrix and a log matrix. Obviously, such a disadvantage is a burden on the DS-CDMA system. In order to solve such a problem, a complexity reduction method is proposed to significantly accelerate a computation process. By using such a method, the computation and storage complexity corresponds to $O(n \log n)$ and $O(n)$, respectively.

C. Reduction of Complexity

The proposed complexity reduction method is a combination of three techniques and three techniques are fast Fourier transform (FFT), a law of log determinant and application of stochastic gradient descent (SGD). By definition, the hyper-parameter set $\theta^*$ may be estimated as shown in [Equation 10] by minimizing negative log likelihood $-\log p(x(i)|y, \theta)$.

$$-\log p(x(i)|y, \theta) = \frac{1}{2} x^T(i) P^{-1} x(i) + \frac{1}{2} \log|P| + \frac{n}{2} \log(2\pi) \quad \text{[Equation 10]}$$

Due to the high complexity for computing the inverse matrix $P^{-1}$, it is necessary to develop an approximation method. It may be a better solving means to approximately minimize an upper bound of the equation term in terms of the approximation, instead of trying to minimize the negative log likelihood. Analytically, in [Equation 10], a better computation focuses on two terms, that is, a data-fit term expressed as $x^T(i) P^{-1} x(i)$ and the log determinant log $|P|$. First, a simplification derivation needs to be applied to the terms to reduce the equation. To this end, the law of the log determinant is used to calculate the log determinant $\hat{P}$ of the empirical covariance matrix $\hat{P}$, which simplifies [Equation 10] to [Equation 11].

$$-\log p(x(i)|y, \theta) = \frac{1}{2} x^T(i) P^{-1} x(i) + \frac{1}{2} \log \hat{P} + \frac{n}{2} \log(2\pi) \quad \text{[Equation 11]}$$

Where $\hat{P}$ is calculated according to [Equation 12] based on the empirical covariance matrix and a constant $\tau$.

$$\hat{P} = \log|\hat{P}| - \tau \quad \text{[Equation 12]}$$

$$w.r.t$$

$$\hat{P} = \frac{1}{n} \sum_{k=1}^{n+1} [x_k(i) - \bar{x}(i)][x_k(i) - \bar{x}(i)]^T$$

$$\tau = \gamma\left(\frac{n}{2}\right) - \log\left(\frac{n}{2}\right)$$

Where $\gamma(\cdot)$ represents a Digamma function. After multiple recalculation, the term $\hat{P}$ a converges to the constant according to a central limit theorem. Minimizing the negative log marginal likelihood after the passage of time due to such convergence may involve only minimizing the reduced negative marginal log likelihood (rMLL) as shown in [Equation 13].

$$-\log p(x(i)|y, \theta) = \frac{1}{2} x^T(i) P^{-1} x(i) \quad \text{[Equation 13]}$$

A gap of the approximation step with respect to the actual solving means may be very small and may be measured using a mean square error of [Equation 14].

$$\mathbb{E}(\hat{P} - \log|P|)^2 = -2\log\left(1 - \frac{1}{n}\right) \quad \text{[Equation 14]}$$

Nevertheless, solving the inverse matrix P in [Equation 13] still costs computationally more. Therefore, another method is required in order to achieve the object. Since the covariance matrix P has a positive-definite value, it is possible to perform the transformation using FFT. Such a technique is used for taking the calculation from a spatial-temporal domain to a frequency domain. It is worth mentioning that the cost of the FFT is only $O(n \log n)$. Obviously, the cost is much better than the method in the related art. Hereinafter, such transformation will be described in detail.

First, the squared exponent kernel $k(y_i, y_j)$ in Equation (8) needs to be rewritten into a Fourier transform representation as shown in [Equation 15].

$$\tilde{\mathcal{F}}_{SE}(\omega) = \theta_2 \theta_1^2 \sqrt{2\pi} \exp(-2\pi^2 \omega^2 \theta_2^2) \quad \text{[Equation 15]}$$

Where $\omega$ is a frequency representation of the received signal y in the frequency domain. It is assumed that $\Psi$ generates a function $\tilde{P} = P^{-1}$. Under the frequency domain, the Parseval theorem is applied to derive the Fourier transform for [Equation 13].

$$\mathcal{F}_{rMLL}(\theta) = \quad \text{[Equation 16]}$$
$$\mathcal{F}(-\log p(x(i) \mid y, \theta)) = \frac{1}{2n} x^T(i) \Psi * x_o(i) \tilde{\Psi} * \tilde{x}_o(i)$$

Where a tilde symbol represents the Fourier transform of $x(i)$ in $\tilde{x}(i)$ and $x_o(i)$ represents a data vector in a periodic domain. In a next step, a convolution theorem is continuously applied to a limit $\Psi \tilde{\mathcal{F}}_{SE} \equiv 1$ and last Fourier transform of rMLL may be expressed as shown in [Equation 17].

$$\mathcal{F}_{rMLL}(\theta) = \frac{1}{2n} \sum_n \Psi_k * \tilde{x}_k^2(i) = \frac{1}{2n} \sum_k \frac{\tilde{x}_k^2(i)}{\tilde{\mathcal{F}}_{SE}(\omega_k)} \quad \text{[Equation 17]}$$

In the form of [Equation 17], $\theta$ which is the set of hyper-parameters may be estimated using a slope-based technique. In this case, the stochastic gradient descent (SGD) is selected because of a characteristic that the SGD is less sensitive to fast convergence and local minima. In order to integrate the SGD, a partial derivative of [Equation 17] is required for each hyper-parameter. Such an equation is given by [Equation 18].

$$\frac{\partial}{\partial \theta_2} \mathcal{F}_{rMLL} = \quad \text{[Equation 18]}$$
$$\tilde{x}_k^2(i) \exp(2\pi^2 \theta_2^2 \omega^2) \left( \frac{2\sqrt{2} \pi^{3/2} \omega^2}{\theta_1^2} - \frac{1}{\sqrt{2\pi} \theta_2^2 \theta_1^2} \right)$$

$$\frac{\partial}{\partial \theta_1} \mathcal{F}_{rMLL} = - \frac{\sqrt{\frac{2}{\pi}} \tilde{x}_k^2(i) \exp(2\pi^2 \theta_2^2 \omega^2)}{\theta_2 \theta_1^3}$$

Subsequently, an update procedure is applied to update the hyper-parameters to corresponding convergence points. Such a process is expressed as shown in [Equation 19].

$$\theta_2^{(k)} \leftarrow \theta_2^{(k-1)} + \alpha(k) \frac{\partial}{\partial \theta_2^{(k-1)}} \mathcal{F}_{rMLL} \quad \text{[Equation 19]}$$

$$\theta_1^{(k)} \leftarrow \theta_1^{(k-1)} + \alpha(k) \frac{\partial}{\partial \theta_1^{(k-1)}} \mathcal{F}_{rMLL}$$

Where $\alpha(k) = 1/(k+1)$ represents a Robbins-Monroe decay function for $k^{th}$ repetition. Such a function is chosen instead of exact line search or backtracking line search or backtracking line search primarily due to a performance problem. Further, in order to control the number of update repetitions, an error function is defined based on a root mean square error (RMSE) method to measure the convergence. It should be noted that the RMSE method is stricter than the means square error (MSE) method which is generally used. By using such an error function, an error gap between a current repetition value and a previous value may be evaluated as shown in [Equation 20].

$$RMSE = \sqrt{\frac{\sum_{j=1}^{n} \mathcal{F}_j^{(k)} - \mathcal{F}_j^{(k-1)}}{n}} \quad \text{[Equation 20]}$$

Where $\mathcal{F}_j^{(k)}$ and $\mathcal{F}_j^{(k-1)}$ represent a value of rMLL at a target location j after $k^{th}$ and $(k-1)^{th}$ repetitions, respectively. In the proposed method, an RMSE threshold is limited to $10^{-11}$ which yields a solving means that is close to an actual value. Obviously, the computation may be performed without the inverse matrix. By the end of the method, a required set $\theta^*$ of hyper-parameters is obtained. In addition, due to the fact that the method does not need to maintain a historical covariance matrix, which is primarily used to inverse the covariance matrix, the computational complexity is only $O(n \log n)$ and the storage complexity is $O(n)$.

Hereinafter, a method for recovering the original signal in the DS-CDMA system using various equations derived through the above process will be described.

Figure 2:
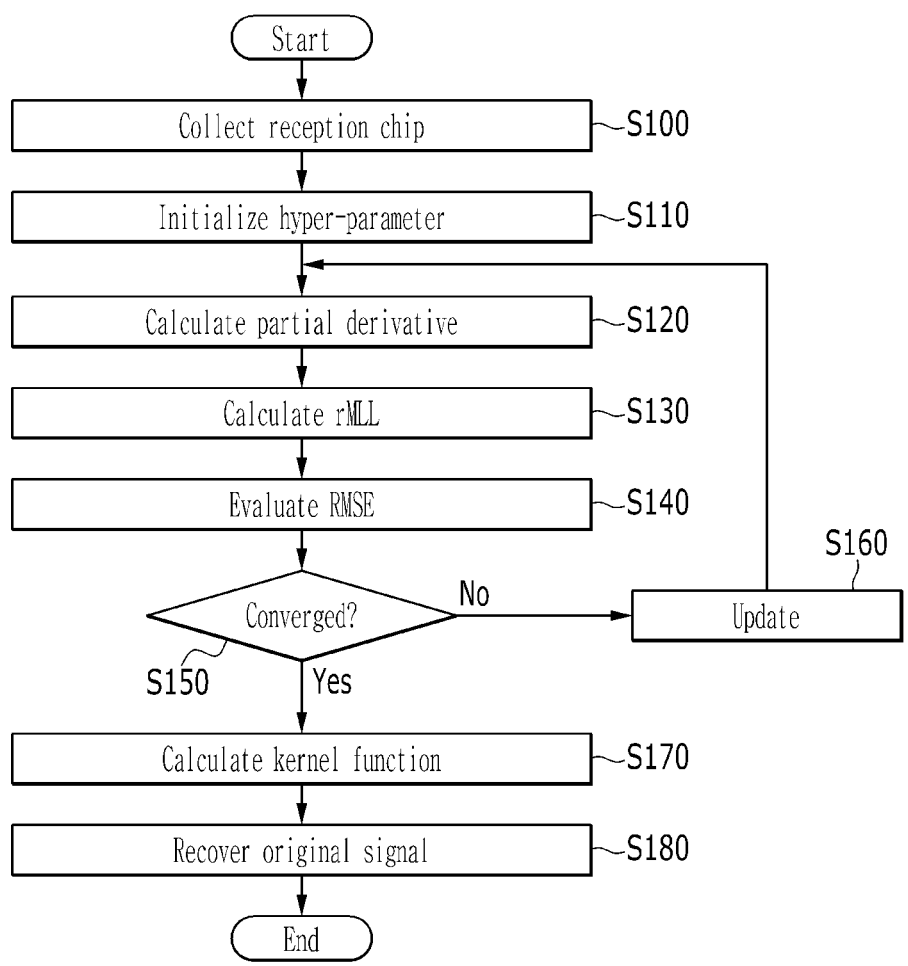
FIG. 2 is a flowchart of a method for recovering an original signal in a DS-CDMA system according to an exemplary embodiment of the present invention.

FIG. 2 is a flowchart of a method for recovering an original signal in a DS-CDMA system according to an exemplary embodiment of the present invention.

Referring to FIG. 2, first, a receiver 30 collects a reception chip received through a channel 20 from a transmitter 10 (S100).

Thereafter, the hyper-parameter to be estimated is initialized in the exemplary embodiment of the present invention (S110).

Next, a partial derivative of rMLL is calculated using a finally derived [Equation 18] by applying fast Fourier transform, a law of log determinant, and stochastic gradient descent (SGD) to GPR according to the exemplary embodiment of the present invention (S120).

Subsequently, the rMLL is calculated using the calculated partial derivative result (S130).

Then, the RMSE is evaluated using [Equation 20] that calculates the error gap between the current repetition value and the previous value (S140).

After determining whether an RMSE evaluation result converges to a preset threshold value (S150), if the RMSE evaluation result does not converge to the preset threshold value, the update is performed using [Equation 19] to update the RMSE evaluation result to the convergence point corresponding to the hyper-parameter (S160).

However, when it is determined in step S150 that the RMSE evaluation result converges to the preset threshold value, the kernel function is calculated using [Equation 8] (S170) and the original signal for a specific user is finally restored using the calculated kernel function (S180).

As described above, in the exemplary embodiment of the present invention, by applying the fast Fourier transform, the law of the log determinant, and the stochastic gradient descent (SGD) to the existing GPR, the regression may be significantly accelerated so that the computational complexity and storage complexity in the case of using the existing GPR are reduced and better BER is maintained.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. A method for recovering an original signal through multi-user detection in a synchronous mobile communication system, comprising:
   calculating a partial derivative of a reduced negative marginal log likelihood (rMLL), thereafter, integrating stochastic gradient descent (SGD) by applying a partial derivative to a fast Fourier transform (FFT) of the rMLL, the rMLL is obtained by applying a law of log determinant to a Gaussian process regression (GPR) scheme used for the multi-user detection;
   calculating the rMLL by using the partial derivative for the rMLL;
   updating a hyper-parameter to a convergence point until an error gap is converged by repeated calculation of the rMLL;
   calculating a kernel function used for estimating a matched filter by using the hyper-parameter estimated through the convergence point; and
   recovering the original signal for each of multi-users by using the kernel function.

2. The method of claim 1, wherein:
   the partial derivative follows an relationship equation below, $$\frac{\partial}{\partial \theta_1} \mathcal{F}_{rMLL} = -\frac{\sqrt{\frac{2}{\pi}} \tilde{x}_k^2(i) \exp(2\pi^2 \theta_2^2 \omega^2)}{\theta_2 \theta_1^3}$$

Where $$\mathcal{F}_{rMLL}(\theta) = \frac{1}{2n} \sum_k \frac{\tilde{x}_k^2(i)}{\mathcal{F}_{SE}(\omega_k)}$$

and represents Fourier transform for the rMLL,
   $\theta_1$ represents an output-scale size,
   $\theta_2$ represents a time-scale of a received signal, y, from one moment up to a next moment,
   $\omega$ is a frequency representation of a received signal, y, in a frequency domain,
   a tilde symbol represents Fourier transform of an original signal x(i) in $\tilde{x}(i)$,
   k, n, i are integers, and
   $\mathcal{F}_{SE}(\omega) = \theta_2 \theta_1^2 \sqrt{2\pi} \exp(-2\pi^2 \omega^2 \theta_2^2)$ and represents Fourier transform for the kernel function.

3. The method of claim 2, wherein:
   the error gap (RMSE) by repeated computation of the rMLL is evaluated through a relationship equation below, $$RMSE = \sqrt{\frac{\sum_{j=1}^{n} \mathcal{F}_j^{(k)} - \mathcal{F}_j^{(k-1)}}{n}}$$

Where $\mathcal{F}_j^{(k)}$ and $\mathcal{F}_j^{(k-1)}$ represent a value of the rMLL at a target location j after $k^{th}$ and $(k-1)^{th}$ repetitions, respectively, and
   n represents the number of repetitions, and
   j is an integer.

4. The method of claim 3, wherein:
   the update is performed by using the relationship equation below, $$\theta_2^{(k)} \leftarrow \theta_2^{(k-1)} + \alpha(k) \frac{\partial}{\partial \theta_2^{(k-1)}} \mathcal{F}_{rMLL}$$

$$\theta_1^{(k)} \leftarrow \theta_1^{(k-1)} + \alpha(k) \frac{\partial}{\partial \theta_1^{(k-1)}} \mathcal{F}_{rMLL}$$

Where $\alpha(k)=1/(k+1)$ represents a Robbins-Monroe decay function for $k^{th}$ repetition.

5. The method of claim 4, wherein:
   the kernel function follows the relationship equation below, $$k(y_i, y_j) = \theta_1^2 \exp\left(-\frac{\|y_i - y_j\|^2}{2\theta_2^2}\right).$$

6. The method of claim 4, wherein:
   applying the law of log determinant to the Gaussian process regression (GPR) scheme is convergence to a constant using a law of log determinant log |P| while minimizing the following relationship equation which is a negative log likelihood for estimating a hyper-parameter set ($\theta$) constituted by $\theta_1$ and $\theta_2$, $$-\log p(x(i) | y, \theta) = \frac{1}{2} x^T(i) P^{-1} x(i) + \frac{1}{2} \log|P| + \frac{n}{2} \log(2\pi)$$

Where $p(x(i)|y, w) = \mathcal{P}(x(i)|\Phi^T w, \sigma_{noise}^2 I)$ and represents a joint Gaussian distribution,
   the matched filter w is a random variable and follows the Gaussian distribution like $p(w) = \mathcal{N}(w|0, \sigma_w^2 I)$ which is a probability of w,
   $\sigma_{noise}$ and $\sigma_w$ represent standard deviations of noise and the matched filter, respectively,
   $I_n$ represents a unit matrix having a size of n,
   $\Phi = [\phi(y_1), \phi(y_2)], \ldots, \phi(y_n)$ represents a vector of non-linear mapping to a higher dimensional space for a received signal) x(i), and
   P represents a covariance matrix.

* * * * *